US007437148B1

(12) United States Patent  (10) Patent No.: US 7,437,148 B1
Vaghi et al.  (45) Date of Patent: Oct. 14, 2008

(54) PERSONAL COMMUNICATIONS SYSTEM AND METHOD

(75) Inventors: Nino R. Vaghi, Bethesda, MD (US); Joseph P. Vaghi, III, Potomac, MD (US); Mary Burns Vaghi, Potomac, MD (US)

(73) Assignee: Vaghi Family Intellectual Properties, LLC, McLean, VA (US)

( * ) Notice: Subject to any disclaimer, the term of this patent is extended or adjusted under 35 U.S.C. 154(b) by 700 days.

(21) Appl. No.: 09/876,049

(22) Filed: Jun. 8, 2001

(51) Int. Cl.
*H04M 3/42* (2006.01)
(52) U.S. Cl. .................... 455/417; 455/418; 455/426.1; 455/462; 379/142.05; 379/211.05
(58) Field of Classification Search ................. 455/417, 455/422.1, 426.2, 223, 463, 550.1, 444, 445, 455/552.1, 426.1, 418, 419, 414.1, 343, 411, 455/433, 450, 557, 558, 462, 556.1, 435.2; 379/67.1, 377, 142.05, 211.05; 340/540
See application file for complete search history.

(56) References Cited

U.S. PATENT DOCUMENTS

| | | | |
|---|---|---|---|
| 4,486,624 A | 12/1984 | Puhl et al. | |
| 4,989,230 A | 1/1991 | Gillig et al. | |
| 5,127,042 A | 6/1992 | Gillig et al. | |
| 5,128,981 A | * 7/1992 | Tsukamoto et al. | 455/450 |
| 5,260,988 A | 11/1993 | Schellinger et al. | |

(Continued)

FOREIGN PATENT DOCUMENTS

WO    WO9743864    * 11/1997

OTHER PUBLICATIONS

Jared Sandberg, "The Big Telecom Disconnect", The Wall Street Journal, p. B1, May 3, 2001.

(Continued)

*Primary Examiner*—Fan Tsang
*Assistant Examiner*—Md S Elahee
(74) *Attorney, Agent, or Firm*—Ked & Associates, LLP

(57) ABSTRACT

A personal communications system includes an interface unit which transmits calls received on a mobile wireless phone to one or more hard-wired telephones. In one embodiment, the interface unit includes a connector which mates with a voice communications port of a wireless device, which may be a cell phone, web-enabled phone, personal digital assistant adapted for wireless communications, or a so-called pocket PC. When a call is received by the wireless device, a processor automatically sends the call to a hard-wired telephone through the connector. In another embodiment, the interface unit is equipped to receive multiple wireless devices, and calls from each device are managed to prevent calls from two or more of the devices from being sent to the hard-wired telephone at the same time. This system thereby advantageously allows a use only one telephone number to satisfy all his personal communications needs. This translates into significant cost savings to the user in terms of end-of-the-month bills and increased convenience to all concerned. In another embodiment, a removable recording medium stores information (e.g., a user's telephone number) for activating the wireless communications device to receive or place calls through a wireless service provider. The wireless communications device may be integrated, for example, into a hard-wired telephone, wireless device, an appliance, a television, or a car. In another embodiment, a cell phone is programmed to automatically configure, and re-configure, itself to operate using cell phone numbers of different users.

41 Claims, 15 Drawing Sheets

U.S. PATENT DOCUMENTS

| | | | |
|---|---|---|---|
| 5,386,455 A | | 1/1995 | Cooper |
| 5,485,505 A | * | 1/1996 | Norman et al. ............. 455/419 |
| 5,526,403 A | | 6/1996 | Tam |
| 5,559,860 A | | 9/1996 | Mizikovsky |
| 5,577,100 A | * | 11/1996 | McGregor et al. .......... 455/406 |
| 5,592,533 A | * | 1/1997 | McHenry et al. ......... 455/435.2 |
| 5,603,084 A | * | 2/1997 | Henry et al. ................ 455/419 |
| 5,604,787 A | | 2/1997 | Kotzin et al. |
| 5,642,414 A | * | 6/1997 | Kazemzadeh ............... 379/377 |
| 5,678,195 A | * | 10/1997 | Suikkola et al. ............. 455/517 |
| 5,737,701 A | * | 4/1998 | Rosenthal et al. ........... 455/411 |
| 5,774,804 A | * | 6/1998 | Williams .................... 455/419 |
| 5,878,339 A | * | 3/1999 | Zicker et al. ................ 455/419 |
| 5,887,253 A | * | 3/1999 | O'Neil et al. ................ 455/418 |
| 5,933,785 A | | 8/1999 | Tayloe ........................ 455/558 |
| 5,974,311 A | * | 10/1999 | Lipsit ......................... 455/418 |
| 6,035,193 A | * | 3/2000 | Buhrmann et al. ....... 455/426.1 |
| 6,044,267 A | * | 3/2000 | Foladare et al. .......... 455/426.1 |
| 6,119,001 A | * | 9/2000 | Delis et al. .................. 455/433 |
| 6,208,854 B1 | * | 3/2001 | Roberts et al. .............. 455/417 |
| 6,215,859 B1 | | 4/2001 | Hanson |
| 6,253,088 B1 | * | 6/2001 | Wenk et al. ................. 455/462 |
| 6,366,784 B1 | | 4/2002 | Hsueh |
| 6,396,906 B1 | * | 5/2002 | Kaplan ...................... 379/67.1 |
| 6,418,306 B1 | | 7/2002 | McConnell |
| 6,445,920 B1 | * | 9/2002 | Pfundstein ............... 455/422.1 |
| 6,466,799 B1 | * | 10/2002 | Torrey et al. ................ 455/462 |
| 6,480,714 B1 | * | 11/2002 | DePani et al. ............ 455/422.1 |
| 6,577,234 B1 | * | 6/2003 | Dohrmann .................. 340/540 |
| 6,580,922 B1 | * | 6/2003 | Kweon .................... 455/426.2 |
| 6,591,098 B1 | * | 7/2003 | Shieh et al. ................. 455/419 |
| 6,618,580 B2 | * | 9/2003 | Parrott et al. ............... 340/7.33 |
| 6,618,587 B1 | * | 9/2003 | Ghafoor ..................... 455/419 |
| 6,622,017 B1 | * | 9/2003 | Hoffman .................... 455/419 |
| 6,687,499 B1 | * | 2/2004 | Numminen et al. ......... 455/423 |
| 6,704,580 B1 | * | 3/2004 | Fintel ...................... 455/550.1 |
| 6,721,236 B1 | * | 4/2004 | Eschke et al. .................. 369/6 |
| 6,735,433 B1 | * | 5/2004 | Cervantes ................... 455/417 |
| 6,771,972 B2 | * | 8/2004 | McDonnell et al. ...... 455/456.1 |
| 6,804,536 B1 | * | 10/2004 | Bultman ..................... 455/557 |
| 6,912,399 B2 | * | 6/2005 | Zirul et al. .................. 455/463 |
| 6,978,154 B1 | * | 12/2005 | Ospalak et al. ............. 455/557 |
| 7,110,789 B2 | * | 9/2006 | Curtiss et al. ............. 455/556.1 |
| 2001/0031651 A1 | * | 10/2001 | Nakae et al. ................ 455/572 |
| 2002/0016164 A1 | * | 2/2002 | Mead et al. ................. 455/414 |
| 2002/0160791 A1 | * | 10/2002 | Markowitz .................. 455/462 |
| 2003/0069014 A1 | * | 4/2003 | Raffel et al. ................ 455/426 |
| 2004/0092254 A1 | * | 5/2004 | Henrick ...................... 455/418 |

OTHER PUBLICATIONS

Rebecca Blumenstein, "Reform Act Hasn't Delivered Promises to Customers", The Wall Street Journal, pp. B-1-B4, May 3, 2001.

Shawn Young, "Complaints Rise as Phone-Service Problems Mount", The Wall Street Journal, pp. B1-B4, May 3, 2001.

* cited by examiner

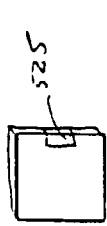
Fig. 17(a)
Fig. 17(b)
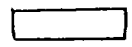
Fig. 17(c)
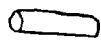
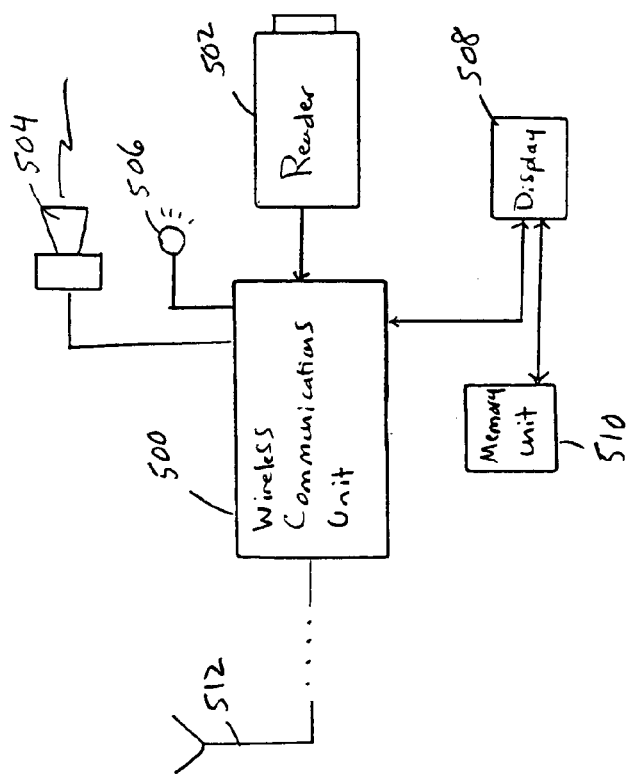
Fig. 16

PERSONAL COMMUNICATIONS SYSTEM AND METHOD

BACKGROUND OF THE INVENTION

1. Field of the Invention

This invention generally relates to voice communications systems, and more particularly to a system and method which consolidates personal communications services by routing telephone calls from a wireless unit to another electronic device, such as a hard-wired telephone. The invention is also a memory card and method for using the memory card to store information for configuring a communications device to perform wireless communications over, for example, a specific telephone number. The invention is also a communications device which may be programmed to operate over a specific telephone number.

2. Description of the Related Art

The last several decades have produced significant advances in personal communications technology. Mobile phones, fax machines, pagers, and e-mail are commonplace in the lives of most people.

While consumers have enjoyed the conveniences of these services, they have not come without a price. Perhaps most significantly, customers are required to have separate phone numbers in order to meet their personal communications needs. It is typically the case, for example, that one number is used for land-line voice communications, another number is used for fax communications, and another number for cellular communications. Still other numbers may be required for paging, long-distance, and internet services. Using separate numbers for these services has proven to be very expensive. During any given month, consumers may expect to receive multiple bills each having separate taxes and services fees applied.

The frustrations associated with the state of the telecommunications industry, in terms of cost and service, was recently recognized by the Wall Street Journal. In an article entitled, *Reform Act Hasn't Delivered Promises to Customers,"* published on May 3, 2001, the Journal made the following observations:

"If it feels like you're spending more money than ever to use the phone and watch TV, you're right.

Despite the Telecommunications Reform Act's promise to unleash price-slashing competition in phone and cable-television service, most households today have no choice in either service, and when they open their bills, almost everything is higher. For example:

Prices for high-speed Internet access has risen 33% since the act took effect in 1996—almost three times the rate of inflation.

Local bills are ballooning due to numerous fees the Bells and regulators have slapped on or ratcheted up . . . Subscriber line charges, which cover the cost of the copper line connecting consumers' homes with the network, will go up in July to $5 per line, from the $3.50 level they were at just a year ago as a result of combining old fees.

. . . [C]onsumers can find they are masing costly calls when using calling cards or an operator. For example, AT&T charges 45 cents a minute and a $2.99 service charge for those dialing its 1-800-CALL-ATT service.

On top of all this, many consumers are wincing at increases in the so-called universal-access fee, a government-ordered subsidy for providing phone service and computer connections to rural communities, schools and libraries. The fee rose this year to about 9.9% of a long-distance bill; a year ago, the fee was $1.38.

The result: Total spending on local, long distance, Internet access, wireless and cable TV per household last year rose more than 13% to $167.40 a month from $147.95 per month in 1996 . . . "

The Journal article discussed above captures the discontent most Americans are feeling with respect to their telecommunications service. The inconvenience of not only paying for but also having to remember two, three, or even four telephone numbers to satisfy consumers' personal communications needs is inefficient for businesses and individuals.

Attempts have been made to reduce the hardware burden on consumers with respect to accessing telecommunications services. Motorola, Inc., for example, has produced a cordless telephone which converts to cellular service when a user carries the phone outside the range of a base unit. Such a phone is disclosed in U.S. Pat. Nos. 5,260,988, 5,127,042, and 4,989,230. The approach taken in these patents does not solve the problems which face users in the telecommunications industry today. For example, the Motorola phones are manufactured to handle calls from both a local exchange carrier and a wireless service provider. Consequently, a consumer who uses these phones is still required to pay for a cellular phone number and a separate land-line phone number.

In view of the foregoing considerations, it is apparent that there is a need for a system and method which not only reduces the hardware burden on consumers with respect to their personal communications needs, but which also reduces the price and inconveniences associated with obtaining services of this type.

SUMMARY OF THE INVENTION

It is one objective of the present invention to provide a system and method which streamlines the costs and efficiencies associated with obtaining personal communications services.

It is another objective of the present invention to achieve the aforementioned objective by integrating mobile wireless telecommunications services with existing land-line-based hardware in a way that only requires the use of a single telephone number to access each.

It is another objective of the present invention to make the aforementioned system available at multiple locations (e.g., home, work, hotels, airplanes, etc.) so that consumers may be reached at any time of day or night through the single telephone number.

These and other non-limiting objectives of the present invention are achieved by providing a personal communications system which includes an interface unit which transmits calls received on a mobile wireless phone to one or more hard-wired telephones. In accordance with a first embodiment, the interface unit includes a connector which mates a voice communications port of a wireless device, which may be a cell phone, personal computer, web-enabled phone, personal digital assistant adapted for wireless communications, or a so-called pocket PC. The connector of the interface unit is preferably located at the base of a slot adapted to fit the dimensions of the wireless device. When a call is received by the wireless device, a processor automatically sends the call to a hard-wired telephone through the connector. The processor may be located in the wireless device or in the interface unit. Alternatively, the interface unit and wireless device may have separate processors which cooperate with one another for sending the call to the wired telephones.

An interface unit of the foregoing type may be mounted at a user's home and office. Because all calls to the user are made using, for example, his cellular telephone number, the user may be reached regardless of his location or time of day. For ubiquitous appeal, interface units may be located on airplanes, hotel rooms, restaurants, as well as other public places. For enhanced functionality, the interface unit may have a port for linking to a personal computer so that the user may access his e-mail. For security purposes, the interface unit may be equipped with a lock and/or a smart card reader for reading authorization codes, which, for example, may be a user's telephone account number.

In order to minimize a user's bills, all calls into a household may be made through the interface unit of the invention. This will alleviate the need to connect the user's hard-wired telephones to the public-switched telephone network. As a result, the user may expect to receive a single bill from his wireless service provider reflecting all of his communications charges. If desired, however, the hard-wired telephones may also be connected to the public-switched telephone network, and a control circuit may be then included for coordinating calls received along land-lines and the wireless provider. A selector may be provided on the interface unit to allow a user to manually set the connection status with respect to the land-lines.

In accordance with a second embodiment, the interface unit contains multiple connectors for receiving multiple wireless devices. Each connector preferably operates in the manner as described above with respect to the first embodiment. A processor, however, may be included in the interface unit for coordinating calls received by the wireless devices. For example, when the hard-wired telephone is handling a call from one wireless device, the processor may alter the activation status of the connectors connected to the other wireless devices. The processor may also control the time of activation of the connectors, or may configure the unit so that each slot operates with a specific hard-wired telephone only. The interface unit may also be equipped with a selector for allowing a user to manually set activation status of the connectors. In the foregoing embodiments of the invention, the interface unit is preferably equipped with a battery re-charger.

Another embodiment of the invention covers a personal communications system which includes a wireless communications unit, a reader connected to the wireless communications unit, and a removable recording medium which stores information (e.g., a user's telephone number) for activating the wireless communications device to receive or place calls through a wireless service provider and which is adapted for insertion into the reader.

The wireless communications unit and reader may be located, for example, in a car, an appliance, a television, a hard-wired telephone, or a wireless device. If in a car, television, or appliance, the wireless communications unit may be equipped with its own speaker and microphone. If in a hard-wired telephone or wireless device, the speaker and microphones of these devices may be interfaced to the wireless communications unit. The removable recording medium may be in the form of a memory stick, memory card, or strip. This embodiment of the invention is especially advantages because it allows users to receive and place calls over a wireless service provider without the use of, for example, a cell phone. Instead, users need only insert the removable recording medium into a reader of an existing device and the device is automatically configured to receive and/or place calls based on that user's number.

Another embodiment of the invention covers a personal communications device (e.g., a cell phone) which automatically adapts to operate in accordance with a cell phone number entered by a user. The device includes an input unit for receiving activation information, a memory unit for storing the activation information, and a processor for automatically establishing communications with a wireless service provider based on the activation information, and for automatically de-activating another telephone number to which the processor had been previously activated. The device may also include a display for automatically prompting a user to input the activation information, a security code, or time-of-activation information which controls a period within which the phone is activated to a given telephone number. The device may be integrated into a hard-wired telephone so that, for example, guests in a hotel room may configure their hard-wired phones to receive calls on the users' cell phone numbers.

BRIEF DESCRIPTION OF THE DRAWINGS

FIG. 16 is a diagram of a personal communications system in accordance with another embodiment of the present invention, equipped to read activation information from a removable recording medium which also corresponds to the present invention.

FIGS. 17(a)-(d) are diagrams showing exemplary configurations for the removable recording medium of the present invention.

DESCRIPTION OF THE PREFERRED EMBODIMENTS

The present invention is a personal communications system and method which transmits calls received by a wireless phone to one or more hard-wired telephones in, for example, a home, office, or public setting. For purposes of the present invention, the following terms are defined as follows.

Definitions

"Hard-wired telephone" corresponds to at least one of: (a) a telephone which receives calls through a land-line connected to a public-switched telephone network, more commonly referred to as a telephone company (TELCO) phone system, (b) a cordless telephone which receives calls from a cordless base station connected to a public-switched telephone network, (c) a telephone connected to a private branch exchange (PBX), (d) a phone used on an airplane such as the GTE AirFone, and (e) any other telephone which is connected by a land-line to a switching network including so-called "house phones" used, for example, in a hotel, restaurant, hospital, etc.

"Land-line" refers to communicating information over traditional copper wires as well as optical fibers.

"Wireless phone" corresponds to a telephone which receives and transmits voice and/or data through a wireless service provider network which operates within specific frequency bands. Telephones of this type include a mobile cellular phone (analog or digital) which operates in a frequency band of 824-893 MHz, a mobile phone which operates in the GSM band of 890-960 MHz, a mobile phone which operates in the Personal Communications Service (PCS) band of 1.8-1.9 GHz, and mobile phones which operate via satellite. (Those skilled in the art can appreciate that the specific frequency bands listed above are subject to change by the Federal Communications Commission and therefore these bands are provided here merely for illustrative purposes).

First Preferred Embodiment

Figure 1:
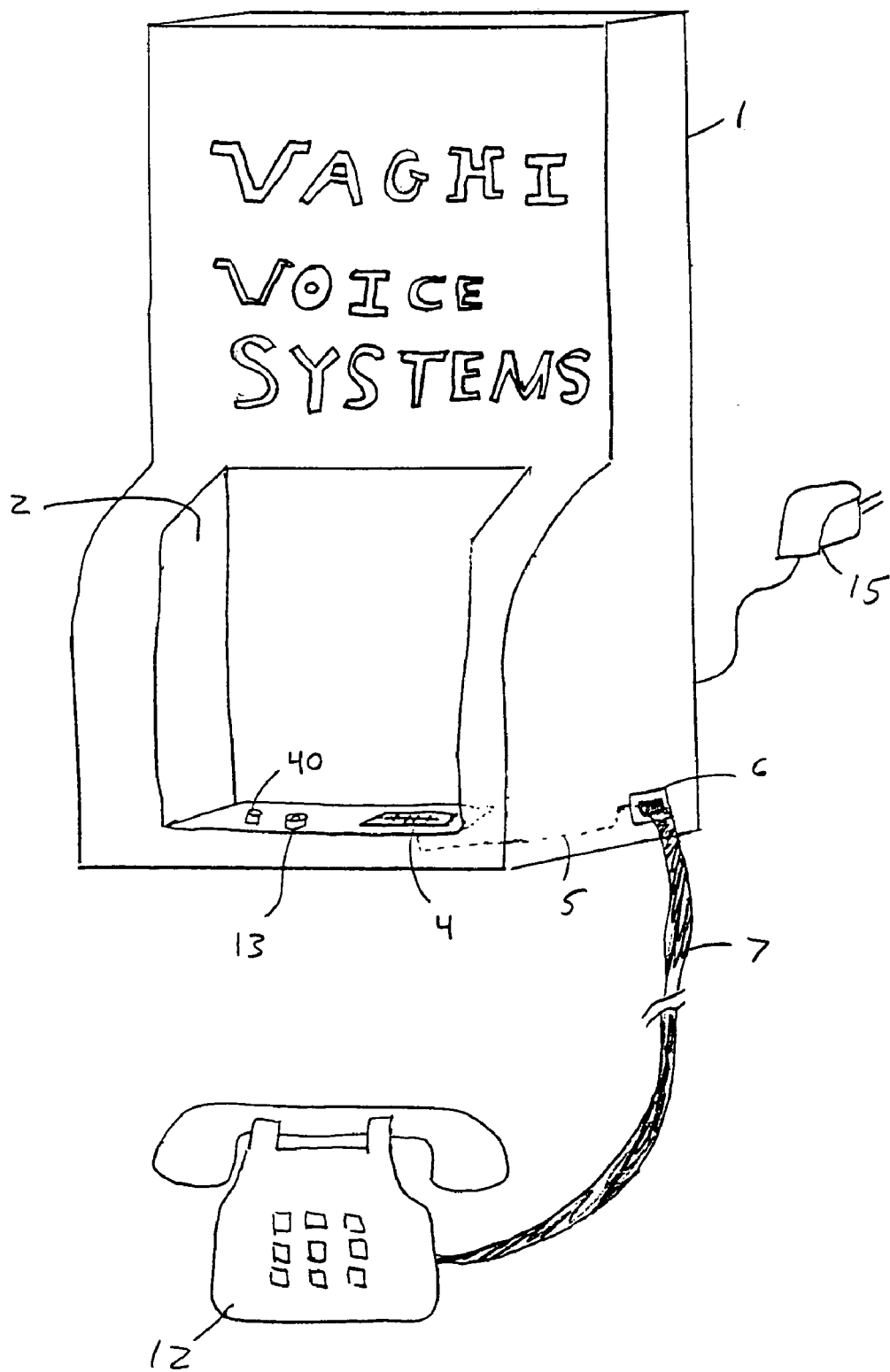
FIG. 1 is a diagram of a first preferred embodiment of the personal communications system of the present invention.

Referring to FIG. 1, a personal communications system in accordance with a first preferred embodiment of the present invention includes an interface box 1 having a slot 2 for receiving a wireless phone. The interface box may be styled to resemble a cradle of the type used to re-charge the battery of a mobile phone. In fact, it is preferable that the interface box includes a battery charger since the wireless phone will essentially be on at all times to sustain communications with a hard-wired telephone in the manner discussed in greater detail below. As those skilled in the art can appreciate, the cradle design of the box is merely illustrative of the invention, as the box may be designed to have virtually any size or shape provided its functional aspects are preserved.

Figure 2:
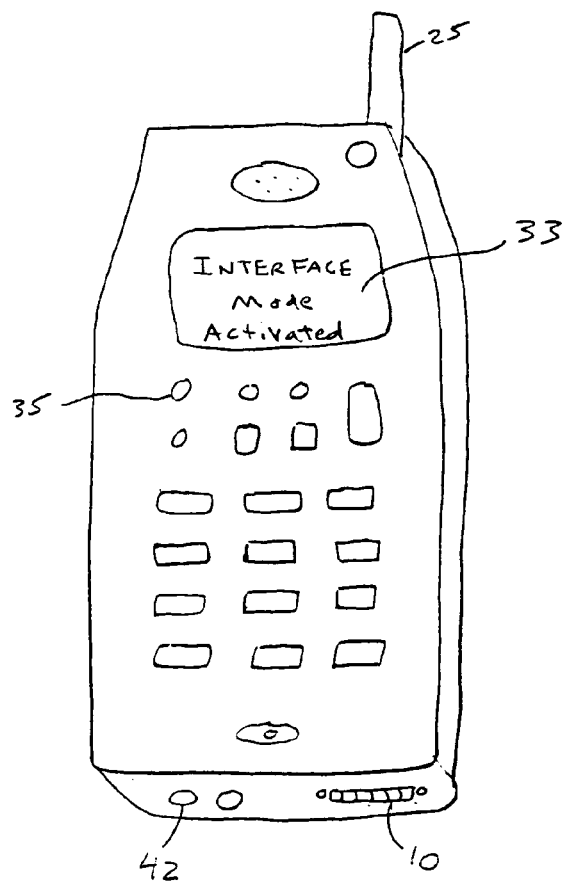
FIG. 2 is a diagram of one type of wireless device included within the personal communications system of the present invention.

In order to connect a wireless call, the interface box includes a voice communications port 4, an internal wire 5, an external jack 6, and a cable 7. The voice communications port is adapted to mate with a complementary connector 10 on a wireless phone as shown, for example, in FIG. 2. Once installed, the communications port conveys voice signals between a wireless service provider network to which the wireless phone is linked and a hard-wired telephone 12 connected to the interface box. Preferably, the ends of the cable include removable connectors for mating with standard phone jacks in the hard-wired phone and the interface box, respectively. While the communications port is shown as residing along a bottom of the slot, this is merely illustrative of the invention as the location of the port may be varied to match the position of the connector on the wireless phone. In addition to these features, the slot may include a terminal 13 for re-charging a battery of the wireless phone. Also, the box itself may be powered by an internal battery (not shown) or through a standard AC adapter plug 15.

The interface box of the present invention performs at least the following functions for connecting a call. For incoming calls, the box forwards a ring signal through the voice communications port to the hard-wired telephone connected to the box. Preferably, the hard-wired telephone is located proximate the wireless phone user. Once the ring signal is answered (e.g., as a result of the user picking up the receiver of the hard-wired telephone, or pushing a button on a cordless phone), voice communication is established between the hard-wired telephone and the caller via antenna 25 of the wireless phone.

For outgoing calls, the wireless phone detects a hook-state signal generated, for example, when the receiver of the hard-wired telephone is lifted. The wireless phone will, in response, automatically configure itself to receive a telephone number dialed on the hard-wired phone. When dialing is completed, the wireless phone will automatically place the call through the wireless service provider network and voice communications will commence through the antenna.

Figure 3:
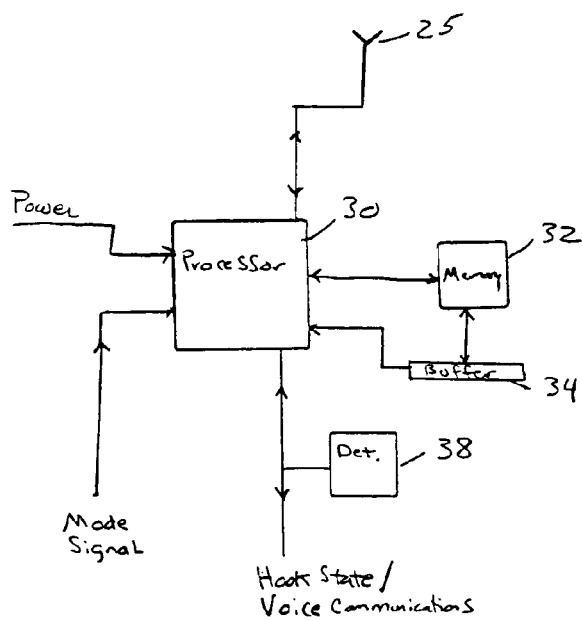
FIG. 3 is a diagram of an exemplary control circuit located within the wireless device of the present invention used for connecting calls.

FIG. 3 is a diagram showing an exemplary control circuit located within the wireless phone of the present invention used for connecting calls. The control circuit includes a processor 30, a memory 32, and a buffer 34. The processor executes a software program which detects and connects calls between the hard-wired telephone and the wireless service provider. More specifically, the processor is connected to the connector 10 (see FIG. 2) of the wireless phone for receiving a hook-state signal from the hard-wired telephone and for controlling bi-directional communications between the connector and antenna 25 when a call is connected. The memory may be a type found in conventional mobile phones which stores, for example, a directory of telephone numbers, phone settings, and information required to identify and establish a link with the wireless service provider. The buffer temporarily stores a telephone number dialed on the hard-wired telephone. The buffer outputs the dialed number to the processor for call connection and, if desired, to the memory for performing re-dial functions.

In order to sustain voice communications, the wireless phone is adapted to receive a mode signal through its voice communications port. The mode signal informs the processor that the wireless phone is to be converted from a standard operating mode (e.g., one where the phone operates as a standard cell phone) to an interface mode, during which time the phone operates as a conduit for establishing voice communications between a hard-wired telephone and the wireless service provider network. The mode signal may be generated in a variety of ways. For example, a user may manually push a mode button 35 on the wireless phone to generate this signal, after which an icon or text message may be displayed on an LCD 33 of the phone.

Alternatively, the mode signal may be automatically generated in at least one of two ways. First, the slot of the interface box may be equipped with a stud 40 (FIG. 1) designed to push a function button 42 (FIG. 2) along the bottom surface of the wireless phone. When the wireless phone is installed in the slot, the stud pushes the function button, thereby sending the mode signal to the processor. If desired, the stud-and-function button arrangement may be replaced by electrodes located on the wireless phone and interface box, respectively. When contact is made between these electrodes, the mode signal would be sent to the wireless phone processor.

Second, the control circuit of the wireless phone may be configured to have a detector circuit 38 which detects when the connector 10 of the wireless phone mates with the voice communications port 4 of the interface box. When a connection is detected, the mode signal is output to the processor. If desired, the function performed by the detector circuit may be performed by the processor in the wireless phone, in order to reduce the number of internal components. In all cases discussed above, when the mode signal is received by the processor, the microphone and speaker of the wireless phone may be de-activated for privacy purposes (i.e., to prevent eavesdroppers from listening to the call) and to save battery energy.

Figure 4:
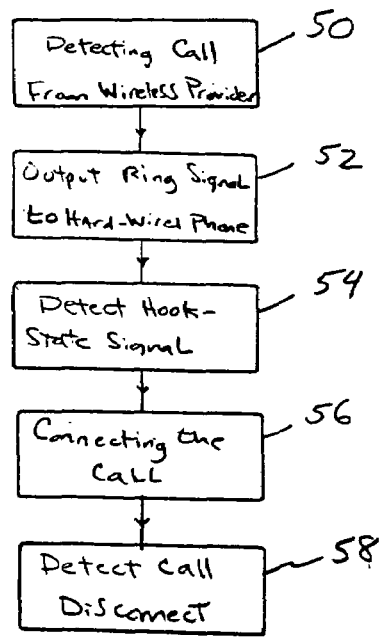
FIG. 4 is a diagram of steps included in a preferred embodiment of the method of the present invention.
Figure 5:
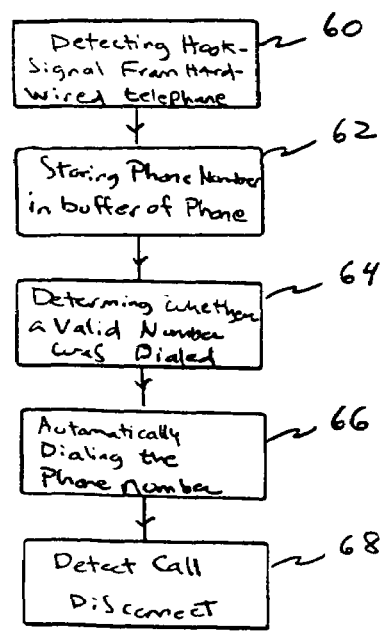
FIG. 5 is a diagram of additional steps included in the preferred embodiment of the method of the present invention.

FIGS. 4 and 5 show steps included in a first embodiment of the method of the present invention for connecting a hard-wired telephone to a wireless service provider network, which steps may be performed in accordance with the software program executed by the processor of the wireless phone. The method begins with the preliminary step of placing the wireless phone in interface mode in response to the mode signal previously discussed. Interface mode includes at least two states of operation. Initially, the wireless phone is in a wait state in which incoming calls are monitored from the wireless service provider network and outgoing calls are monitored from the hard-wired telephone. The wireless phone automatically converts to an active (or connect) state when an incoming or outgoing call is detected.

For incoming calls, as shown in FIG. 4, the method includes detecting a signal from the wireless service provider indicating that someone has called the phone number of the owner of the wireless phone. (Step 50). This signal is received through the antenna of the wireless phone. Under standard conditions, the ringer of the wireless phone would be activated. In interface mode, however, the ringer function of the phone is preferably de-activated. A ring signal is then output to a hard-wired telephone through connector 10 and voice communications port 4. (Step 52).

In a next step, the processor of the wireless phone detects a hook-state signal from the hard-wired phone indicating that someone has picked up the receiver. (Step 54). In response to this signal, the processor automatically connects the call by linking the hard-wired telephone to the wireless service provider network. (Step 56). The call is terminated in one of two ways. If the called party hangs up, the wireless phone detects a hook-state signal indicating that the call has been terminated. The processor of the wireless phone then disconnects the call and the phone is placed back into the wait state. If the caller hangs up, the processor detects that the wireless service provider has terminated the call. The processor of the wireless phone then automatically returns to the wait state. (Step 58).

For outgoing calls, as shown in FIG. 5, the method includes sending a hook-state signal to the wireless phone indicating that a user of the hard-wired telephone has picked up or otherwise activated the receiver. (Step 60). Detection of this signal causes the processor to activate the buffer for storing a telephone number dialed on the hard-wired telephone. (Step 62). When a certain number of digits have been dialed and stored in the buffer (e.g., 7 numbers for a local call, 10-numbers when an area code is included, or 11 numbers when a "1" precedes the area code) and a predetermined amount of time has passed since the last digit was dialed, the processor concludes that the caller is finished dialing.

In a next step, a determination is made as to whether a valid telephone number has been dialed. (Step 64). This step may be performed based on the number of digits stored in the buffer. For example, if the number of digits in the buffer equals 7, 10, or 11, the processor may conclude that a valid number has been dialed. Conversely, if 6 digits have been dialed or any other number which does not correspond to what is considered to be a valid telephone number, the processor may conclude that an invalid number has been dialed. Under these circumstances, the hard-wired telephone may remain unresponsive, indicating to the user that he should hang up and re-dial. Alternatively, the processor of the wireless phone may be programmed to output an error tone signal to the hard-wired telephone receiver, informing the user that he should hand up and redial. Detection of a hook-state signal indicating that the receiver has been placed on the hook returns the wireless phone to the wait state.

Once a determination has been made that a valid telephone number has been dialed, the processor of the wireless phone establishes a connection with the wireless service provider network through the antenna. The number stored in the buffer is then automatically dialed and the user is connected to the called party through the wireless provider network. (Step 66). The call may be terminated in a way similar to that discussed above. If the caller hangs up, the hard-wired telephone detects a hook-state signal indicating that the call has been terminated, the processor disconnects the call, and the wireless phone is returned to the wait state for monitoring new calls. If the called party hangs up, the processor detects that the wireless service provider has terminated the call, and the wireless phone automatically returns to the wait state. (Step 68).

The system and method of the present invention represents a significant improvement in the art for at least several reasons. Perhaps most significantly, through the present invention, a user may satisfy all his communications needs using a single telephone number. This may be achieved by connecting the interface box to at least one hard-wired telephone in the user's house. Under these circumstances, all calls to the user would be received through his wireless number, thereby alleviating the need to connect the hard-wired telephones in his home to a local exchange carrier or other public-switched telephone network. Instead of paying two telephone bills at the end of the month (e.g., one to a Baby Bell and one to a cellular carrier), the user will therefore be able to consolidate his bill by paying only one wireless charge. As the cost of wireless services becomes cheaper, it is readily apparent that the invention will provide an efficient and cost-effective approach for satisfying users' personal communications needs.

These advantages may be carried over to other areas of the user's life. For example, the user may connect an interface box at his place of business, hotels and hospitals may keep interface boxes in their rooms, restaurants may provide interface boxes at customer tables, and airplanes may install boxes at every seat. The interface box of the invention, thus, provides a way of ensuring that wherever the user goes he may always be reached by family members, his employer or friends through a single telephone number. This will prove to be a great convenience to callers who often must remember multiple phone numbers (e.g., fax, business phone, home phone, etc.) for the persons they wish to call.

The system and method of the present invention also offers significant advantages to telephone companies. As the last decade has shown, more and more users require fax, voice, and data services to meet their personal and business needs. These services typically require separate telephone numbers. History has shown that the supply of new telephone numbers quickly becomes exhausted in highly populated areas because of customers' diverse communications needs, especially in urban areas. This increased demand has necessitated changes in phone service which have cost telephone companies literally millions of dollars. One such change involves requiring customers who live in cities that border two or more states to dial area codes for local calls. This approach has most recently been taken in the Washington, D.C. area which is the home of the U.S. Patent and Trademark Office.

The present invention provides an effective solution to this problem. Instead of using multiple telephone numbers, customers will only need one telephone number supplied by a wireless provider. By linking their wireless phones to landline phones, customers will be available to receive a telephone call regardless of location, and this is true even in areas where wireless reception is poor or impossible. On a per-customer basis, therefore, the number of telephone numbers may be significantly reduced, saving telephone companies significant financial resources.

Figure 6:
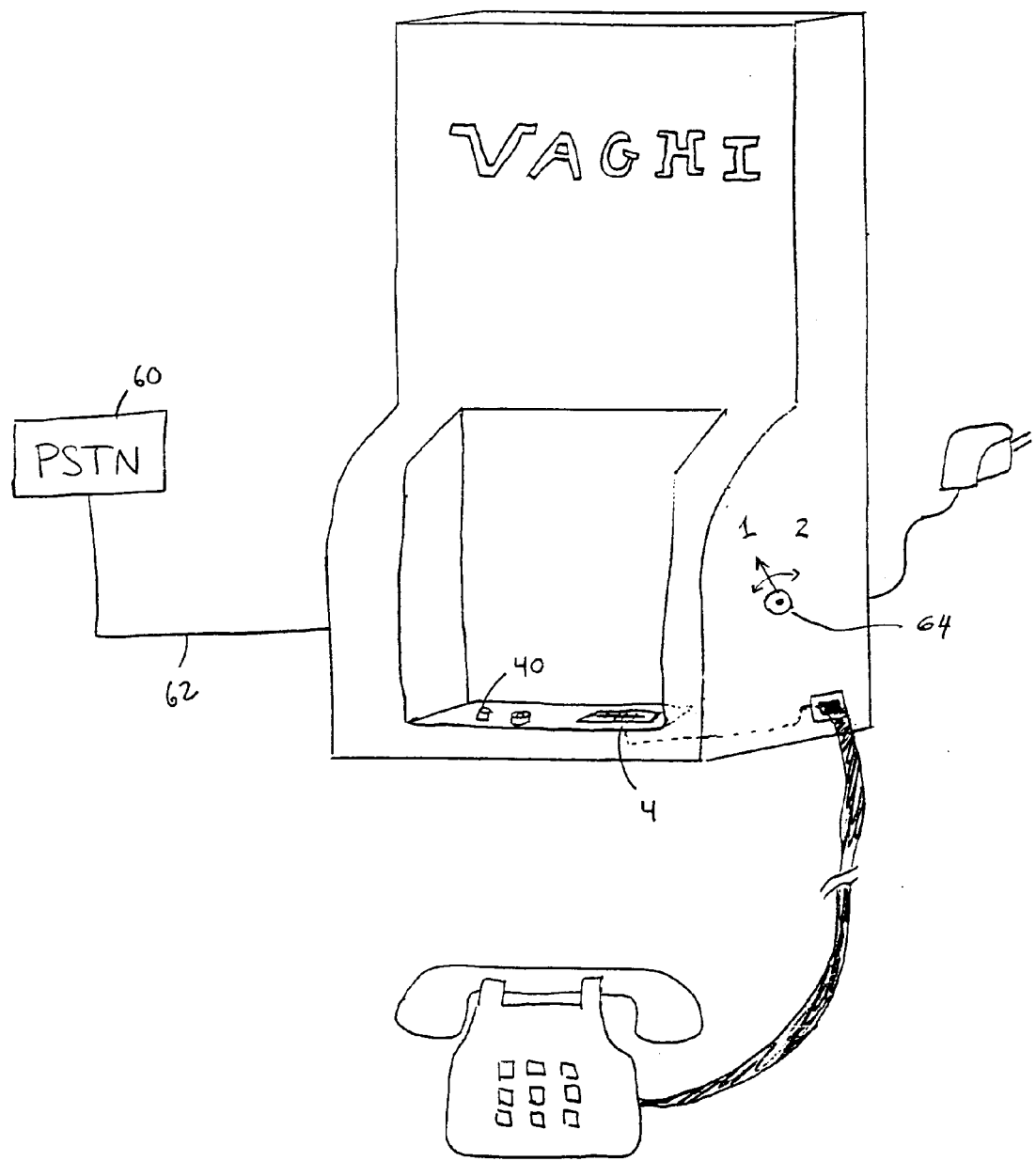
FIG. 6 is a diagram of a variation of the first preferred embodiment of the personal communications system of the present invention.

The interface box of the present invention may be equipped with a number of optional features. As shown in FIG. 6, the interface box may be connected to a line 62 which connects all the hard-wired telephones in a user's house to a public-switched telephone network (PSTN) 60. A selector switch 64 may then included on the box to switch between two service modes. The first mode (e.g., mode "1") disconnects the hard-wired telephones from the PSTN, thereby configuring the hard-wired telephones in the house to receive calls from only the wireless service provider. Under these circumstances, the processor of the wireless phone may be programmed to generate an artificial dial tone which may be heard by users when the receivers of the hard-wired telephones are lifted or otherwise activated.

The second mode (e.g., mode "2") may allow the hard-wired phones to be connected to both the wireless service provider (vis-a-vis the wireless phone mounted in the interface box) and the PSTN. Under these circumstances, the interface box may operate as a logical OR function, passing the first telephone call received from the PSTN or wireless service provider to the hard-wired telephones. During the call, the interface box may include a control circuit that blocks the hard-wired telephone from receiving calls from the other network. If desired, there may be a selectable third mode of operation in which the hard-wired phone is only connected to the public-switched telephone network.

Figure 7:
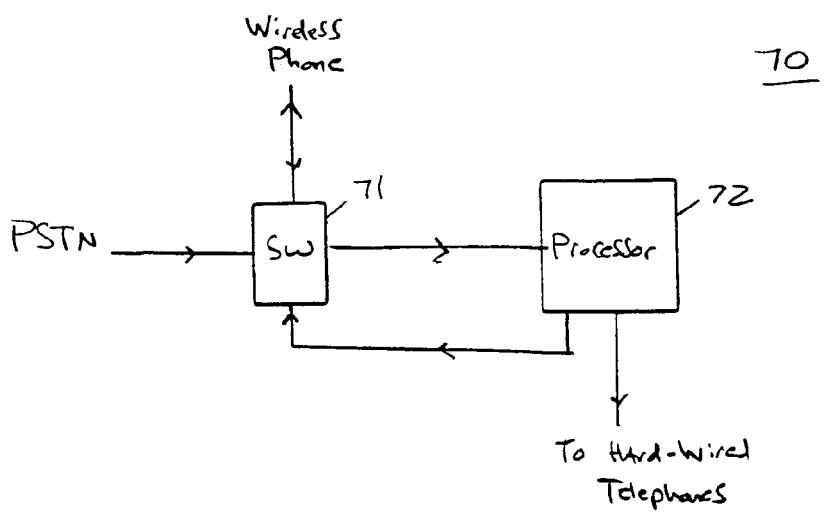
FIG. 7 is a diagram of one possible configuration of a control circuit used which may be used in the system of the present invention for blocking calls when the hard-wired telephone is in use.

One possible configuration of a control circuit for blocking calls when the hard-wired telephone is in use is shown in FIG. 7. This control circuit 70 includes a switch 71 and a processor 72. In operation, the processor detects from which network the call is received. This may be determined, for example, by the switch outputting information to the processor indicating along which input of the switch the call was received. If the hard-wired telephones are not in use at that time, the call is connected in the manner previously described and the processor outputs a signal to the switch to disconnect the other network. Thus, if a call were first received on the PSTN, the processor would output a switching signal to switch 71 to disconnect the wireless phone from accessing the hard-wired telephones.

Figure 8:
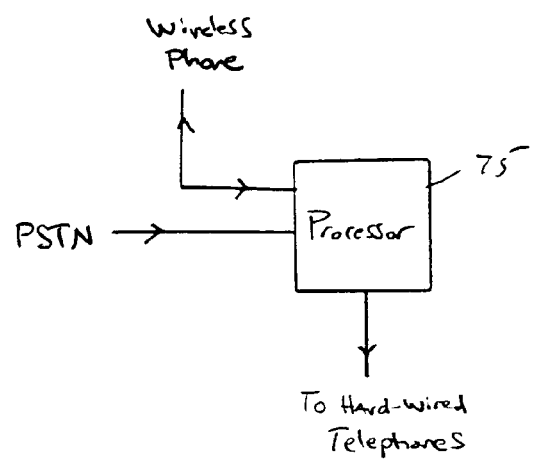
FIG. 8 is a diagram of another possible configuration of a control circuit used which may be used in the system of the present invention for blocking calls when the hard-wired telephone is in use.

An alternative embodiment of the control circuit is shown in FIG. 8. This control circuit includes a processor 75 which is programmed to perform a switching function similar to switch 71. In operation, the processor detects from which network a call is received. If the call were first received on the PSTN, the processor outputs a blocking signal to the wireless phone (e.g., through its voice communication port) to place it in an interrupt mode, which effectively places the phone in an inactive state. All calls received by the wireless phone at this time would then be forwarded, for example, to a voice messaging system maintained by the wireless service provider. When the call on the PSTN is terminated, the processor of the interface box would detect the termination and output a resume signal to the wireless phone to place it back in a call-receiving mode, e.g., the wait state previously mentioned.

Many wireless phones store information indicating that the phone owner has missed a call. If such a phone is inserted into the interface box of the invention and a call is missed, the wireless phone processor may be programmed to output a missed-call signal to the processor 75, which in response may generate a ring signal to the hard-wired phones alerting the owner that he has missed a call. The ring produced by this signal may be a special ring in terms of its tone and/or its rhythm. For example, a regular ring may ring three times but a missed-call ring may only ring twice. When the user picks up the receiver of the hard-wired telephone, processor 75 may output an instruction to the processor of the wireless phone to automatically connect to the user's voice mail. The interface box may even include a voice synthesis circuit which outputs an artificial audible message to the hard-wired telephone receivers informing the user that he has missed a call on the wireless network. As an alternative, an audible tone may be heard when the receiver is picked up or otherwise activated. In either case, the processor of the wireless phone may be programmed to automatically connect the hard-wired telephone to a voice messaging system. (The functions of the wireless phone processor described above may instead be performed by a processor of the interface box, which processor is discussed in greater detail below.)

If the call was first received from the wireless service provider network, the processor merely switches off the PSTN connection in a manner functionally similar to switch 71. This connection would be resumed once the processor 75 detected that the wireless call was terminated. If desired, the interface box may be provided with an answering machine which could take a message from the caller on the PSTN when the hard-wired telephones were connected to the wireless caller. An audible message and automatic connection to the answering machine may then be performed when the receiver of the hard-wired telephone is activated after the call is terminated, as previously described.

The embodiments shown in FIGS. 7 and 8 are desirable because they allow customers to remain connected to the local exchange carrier and the wireless provider at the same time. This may prove beneficial for a number of reasons. For example, a house guest could place his cellular telephone in the interface box of the present invention during a visit. In this situation, the owner of the house could still receive calls along the land-lines and the house guest could receive calls through his cell phone number. This would allow the guest to recharge his battery in the charger portion of the interface box without missing a call.

These embodiments of the invention may also prove beneficial to family members. For example, consider the case where the father is the owner of the cell phone. Under these circumstances, if the hard-wired telephones in the house were disconnected from the local exchange carrier, the mother and children would not be able to receive calls while the father was at work, because presumably the father would have his cell phone with him. Switching the selector of the interface box to mode 2 would allow the mother and children to receive calls from the local exchange carrier during this time.

Figure 9:
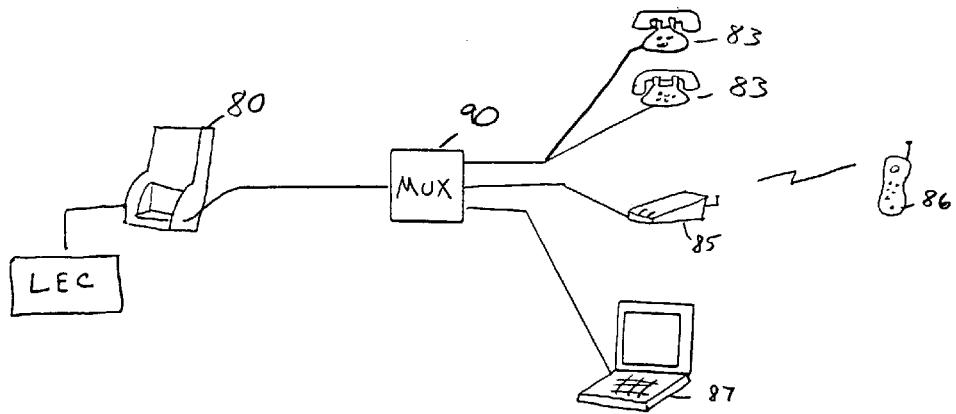
FIG. 9 is a diagram of another variation of the first preferred embodiment of the personal communications system of the present invention.

FIG. 9 shows another optional embodiment of the present invention. In this embodiment, an interface box 80 is connected to multiple hard-wired telephones 83 through a multiplexer unit 90. A separate jack connection may be used for each telephone. Alternatively, the multiplexer unit may be included within the interface box housing and connected to a single line which then splits into different lines connected to each phone. The interface box may be connected to the wireless phone only, or an additional connection may be established to the local exchange carrier (LEC). In a home setting, the hard-wired telephones may include a cordless telephone including a base unit 85 and a handset unit 86, and/or phone software implemented on a computer 87.

Second Preferred Embodiment

Figure 10:
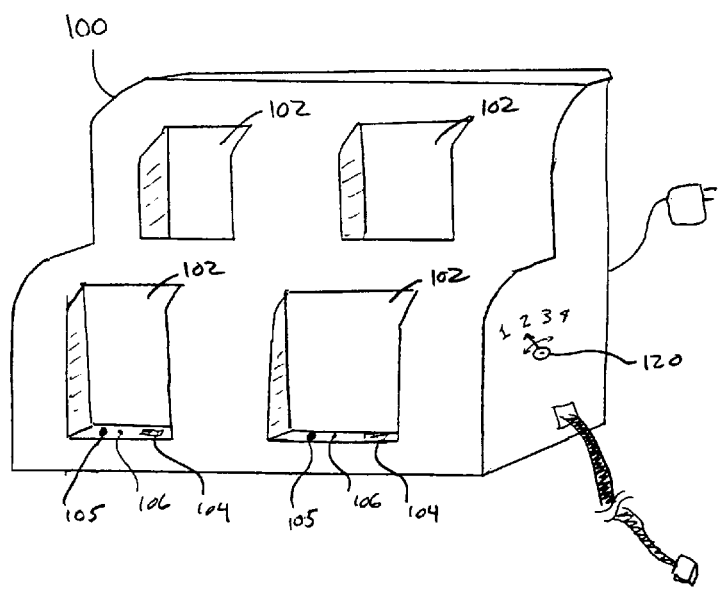
FIG. 10 is a diagram of a second preferred embodiment of the personal communications system of the present invention.
Figure 11:
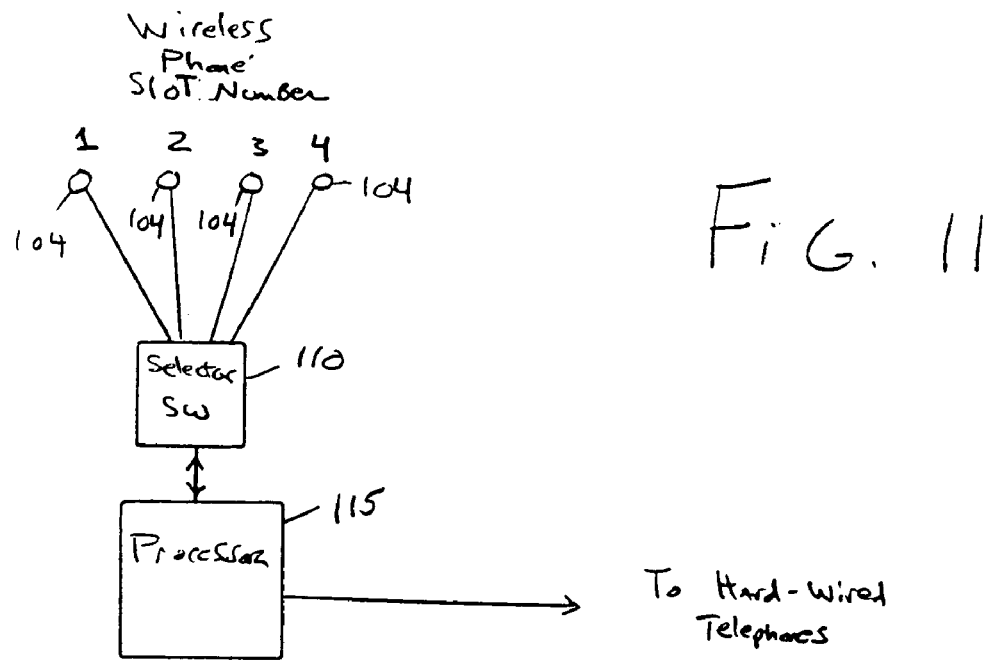
FIG. 11 is a diagram of a control circuit within the personal communications system of the second preferred embodiment for coordinating calls from the wireless phones.

Referring to FIG. 10, a personal communications system in accordance with a second preferred embodiment of the present invention includes an interface box 100 having slots 102 for receiving multiple wireless phones. Preferably, each slot has the functional and structural features of the slot shown in FIG. 1, including a connector 104, a stud 105, and a battery charging terminal 106. Through the multiple slots of this embodiment, one or more hard-wired telephones may receive calls from multiple wireless telephone numbers vis-a-vis the interface box. This is especially advantageous because, for example, guests of the house owner may plug in their respective cell phones into the slots and receive calls on the hard-wired telephones during their visit. The connection, call connect, call termination, and other features for each slot not specifically addressed below may be performed as described with respect to the first preferred embodiment.

In order to coordinate telephone calls from the wireless phones, the interface box includes a control circuit as shown in FIG. 1. This circuit includes connectors 104, a switching unit 110, and a processor 115. The switching unit is connected at one end to the voice data ports of the wireless phones through respective connectors 104, and at another end to the processor. In operation, the processor determines from which wireless phone a call is received, e.g., based on the input terminal of the switching unit. The processor then outputs a switching signal to the switch to connect only that input terminal. The remaining phones are disconnected. When processor 115 detects that the call has been terminated, the control circuit returns to a wait state where all the input terminals (wireless phones) are monitored for calls. To provide enhanced control, the interface box may be equipped with a selector switch 120 for allowing a user to manually set which wireless phone slot is active for receiving calls.

Figure 12:
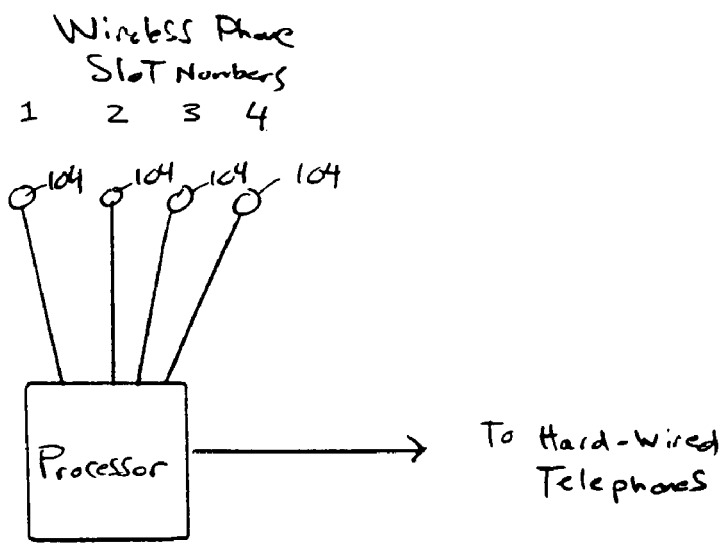
FIG. 12 is a diagram of another control circuit within the personal communications system of the second preferred embodiment for coordinating calls from the wireless phones.

An optional configuration of the control circuit is shown in FIG. 12. In this circuit, a processor detects from which wireless phone a call is received. Blocking signals, as previously described, are then output to the remaining wireless phones during connection of the call. The voice messaging features may be performed with respect to the inactive phones as also previously described.

Figure 13:
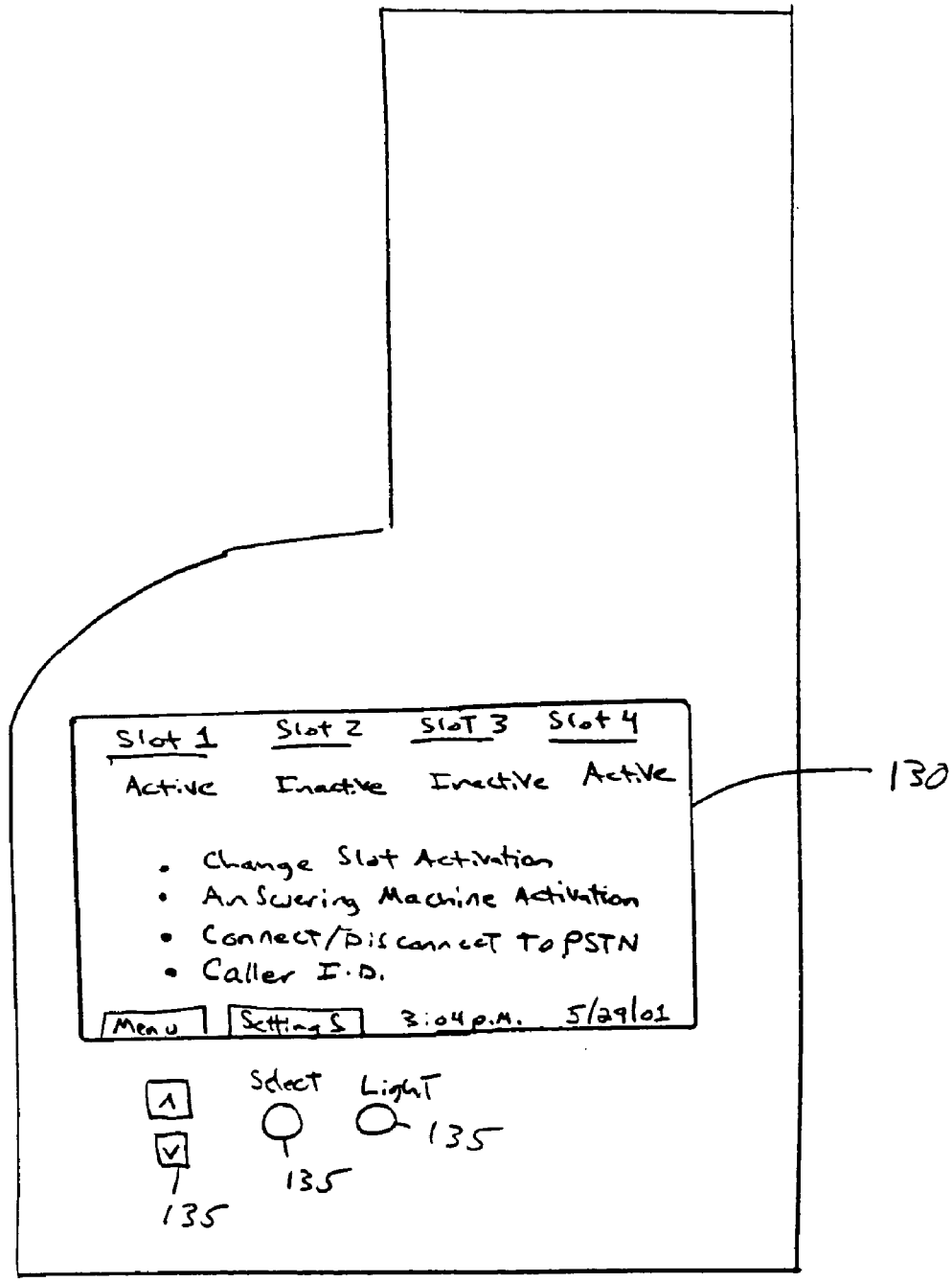
FIG. 13 is a diagram of a graphical user interface included in the second preferred embodiment of the system of the present invention.

As shown in FIG. 13, the interface box may include a number of optional features. For example, the processor of the box may be configured to output a different ring signal depending upon which wireless phone received the call. For example, slot 1 may output a tone ring signal to the hard-wired phones, while slot 2 may output a pulse ring signal. Alternatively, the number of rings per slot may be varied. Providing a different ring signal for each slot will allow house guests, or even family members with their own cell phones and cell phone numbers, to immediately recognize who the intended recipient of an incoming call might be.

Another optional feature may control the time of activation of the wireless phone slots. This will prove highly desirable if the invention is, for example, used in a home with multiple teenage children. In accordance with these features, the processor of the interface box may be programmed so that the daughter's cell phone slot is activated between 7 and 9 p.m., and the son's cell phone slot is activated between 9 and 11 p.m. At all other times, all the slots may be activated for receiving calls.

In order to coordinate slot activation and other functions, the interface box may include a graphical user interface which includes a display 130 and one or more function buttons 135. The information presented on the display may be controlled by the internal box processor. For illustrative purposes, the following information is =shown on the display: slot activation status, a menu of selectable system functions including "change slot activation," "answering machine activation," "connect/disconnect to PSTN," and "Caller I.D." The menu items may be selected with the up and down function buttons and the select button. In lieu of the function buttons, a touch screen display may be used.

The change slot activation option may allow a user to change the configuration of active slots. Any pattern of the slots may be activated.

The answering machine option may allow a user to activate an answering machine for a particular slot, even if the owner of the cell phone corresponding to that slot is home. If desired, a separate answering greeting and mail box may be kept for each slot. Play back, record, and other standard features of an answering machine may be controlled through sub-menu selections.

The connect/disconnect to PSTN option allows a user to disconnect the interface box to the local exchange carrier. If the user desires to only have wireless phone service, the house may be entirely disconnected from this carrier.

The caller I.D. function may be automatically performed when a call is received. For example, the display may display the number of an incoming telephone call, or this information may be sent to the hard-wired phone if, for example, the hard-wired phone itself has a display. Many cordless phone handsets on the market today have such a display. If the caller is not home, the processor of the interface box may record all missed calls in addition to sending the calls to the appropriate answering machine mail box. When a user comes home, he or she may then scroll through the caller I.D. numbers on the display.

Those skilled in the art can appreciate that the foregoing graphical user interface functions are provided merely by way of illustration, and that if desired other functions may also be included. For example, the display may have a selectable "menu" and "settings" icons which allows a user to access an expanded set of system features. The date and time may also be displayed. Further, if desired the graphical user interface may be programmed to operate as a so-called Internet Appliance, e.g., a device which is connected to the internet to allow users to access e-mail, web sites, and perform browser functions. Under these circumstances, the interface box would be connected to an internet server wirelessly, via cable modem, or conventional land-line modem.

Third Preferred Embodiment

Figure 14:
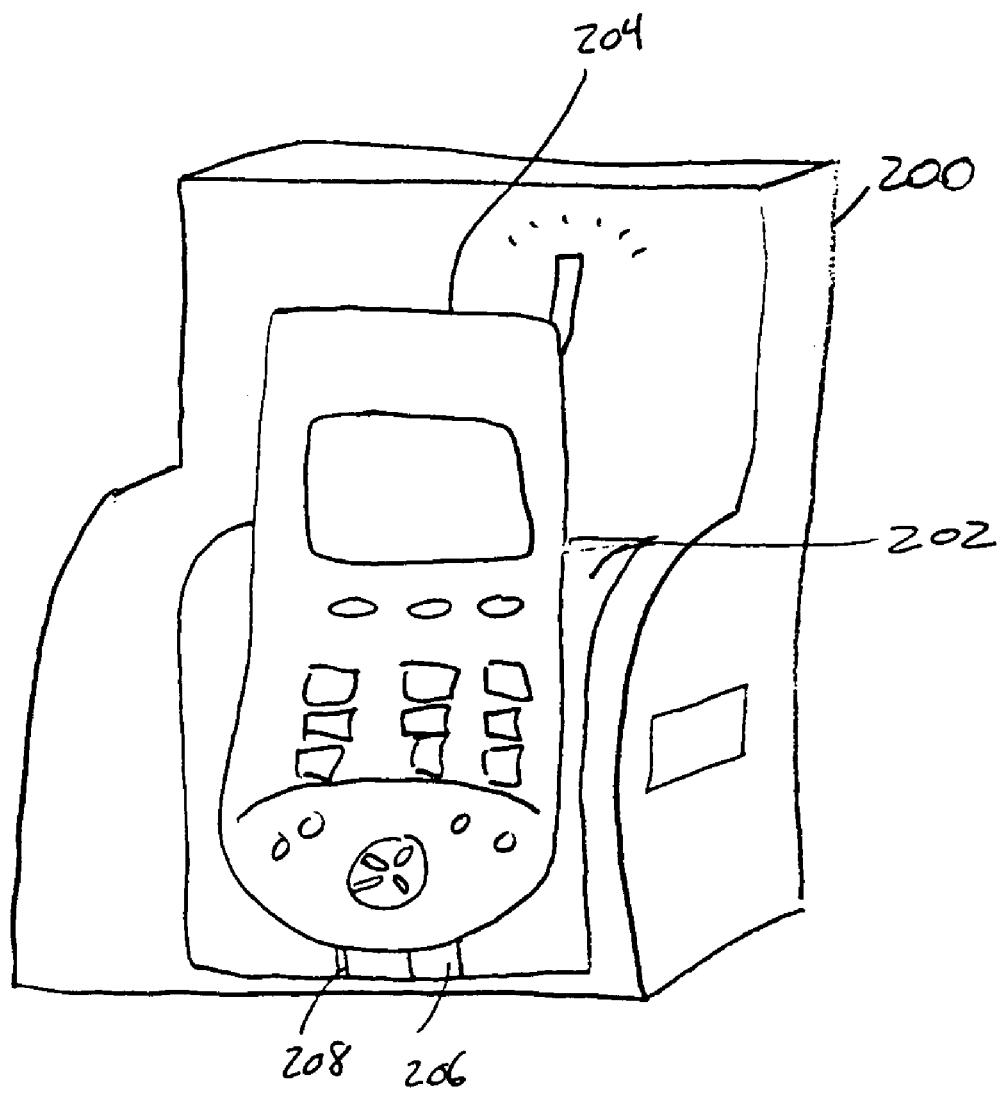
FIG. 14 is a diagram of a third preferred embodiment of the personal communications system of the present invention.

Referring to FIG. 14, a personal communications system in accordance with a third preferred embodiment of the present invention includes an interface box 200 having a slot 202 adapted to receive an electronic device 204 in the form of a personal digital assistant, a pocket PC, a web phone, or any other form of hand-held device which performs processing functions and which has been adapted to perform wireless phone operations. The PDA and pocket PCs may include a wireless modem card for this purpose. Examples include the AirCard 300 and AirCard 510 sold by Sierra Wireless and the Merlin card sold by Novatel Wireless.

Functionally, interface box 200 operates in a manner similar to the previous embodiments. For example, in order to communicate in-coming and out-going calls between a hard-wired telephone and a wireless service provider network the box includes a connector 206 adapted to mate with a port on the electronic device. This port may be any type of port conventionally used including a USB port found in many wireless devices today. Although one slot is shown, the interface box of this embodiment may have multiple slots for receiving PDAs which may be selectively activated, as described above. A battery re-charging terminal 208 may also be included.

Additional Optional Features

The foregoing embodiments of the present invention may include one or more of the following optional features.

PC Connectivity. The interface box may be linked to a personal computer for allowing a user to remotely program the functions (e.g., slot activation status) of the box. The link may be established through a cable or wirelessly in accordance with, for example, the so-called Bluetooth protocol or another digital wireless standard. Infrared may also be used for this purpose if the box is within a line-of-sight of the personal computer. Through this PC connection, the functions/settings of the box may even be remotely programmed through the internet.

Improved Reception. The interface box may be connected to a booster antenna to improve the reliability of the receiving calls within the system. The antenna may be local to the box or remote such as, for example, on the roof of a house.

Security. The interface box may be equipped with a lock which either de-activates the box or makes its settings unchangeable. The lock may be in the form of a key-lock or a program stored in a memory of the interface box which limits access to only those persons with a combination code. (The box may include a set of buttons used for entering the combination.) Regional Control. For the multiple-slot embodiments, the interface box may be programmed, via its internal processor, so that certain slots only ring certain hard-wired telephones. For example, the wireless phone in slot 1 would only ring the hard-wired telephone in the kitchen, the phone in slot 2 would only ring the telephones in the basement and kitchen, and the phone in slot 3 would only ring the bedroom telephones. As an alternative to programming, selective ringing may be performed by directly wiring the telephones to the slots in the box.

Figure 15:
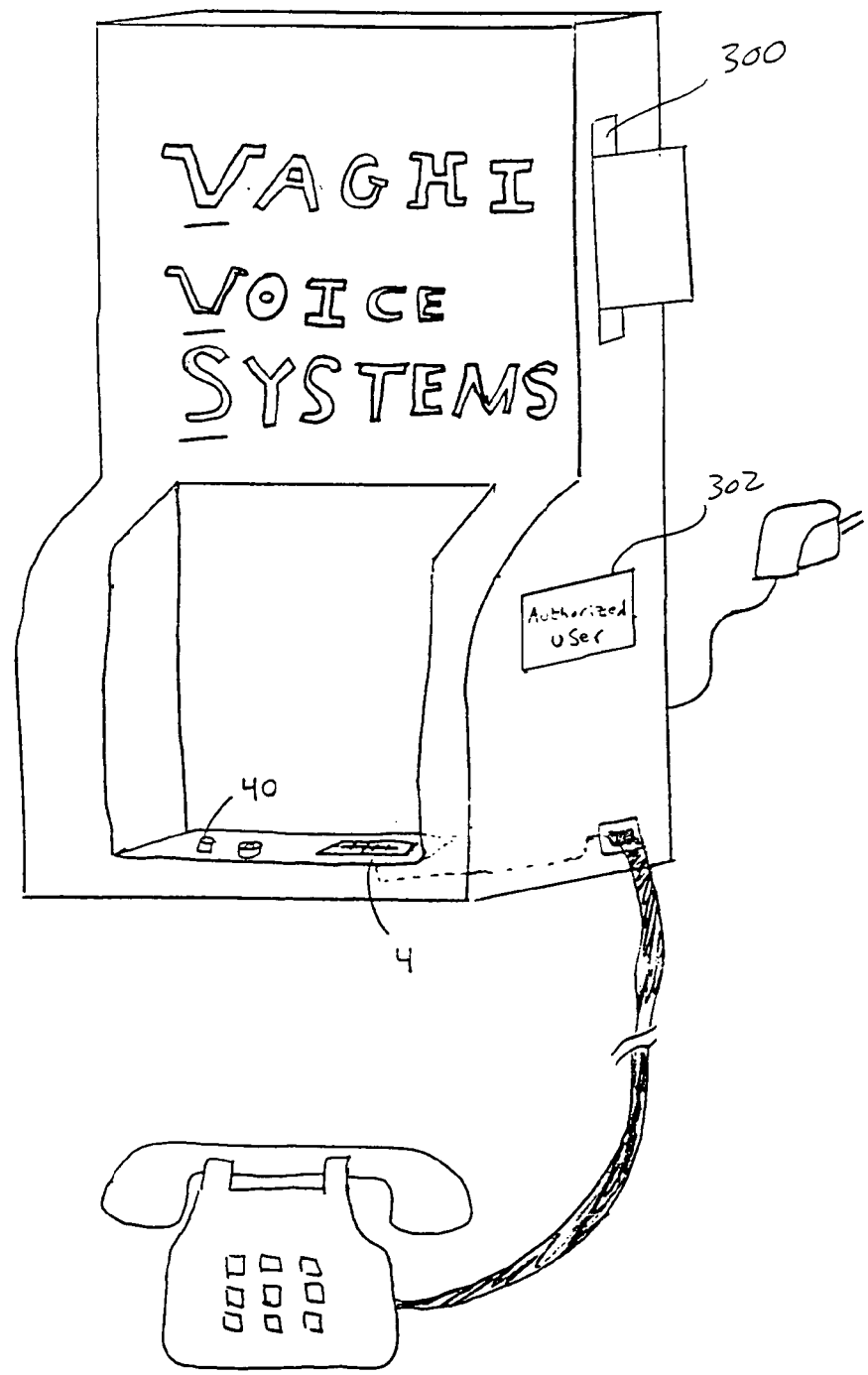
FIG. 15 is a diagram of a personal communications system in accordance with the present invention equipped with a smart card reader.

Smart Card Activation. When the interface box is used in a non-domestic setting (e.g., hotel rooms, hospitals, airplanes, etc.), the box may be equipped with a card reader for reading information on a smart card. This information may include a user code which may be compared to authorized codes stored in a memory of the box or in a remote server connected to the box. In operation, a user inserts his smart card into the reader, and after a code comparison is performed a display or light indicator informs the user whether he is authorized to use the box. The smart card may store the user code on a magnetic stripe, in a storage chip, or within any other type of storage medium conventional known. FIG. 15 shows an exemplary embodiment of this box, which includes a card reader 300 and a display 302 for displaying authorization verification information.

Interface Box Location. The interface box of the invention may be integrated into any one of a variety of existing units, including a television, a hard-wired telephone, an appliance, and an airplane seat to name a few.

Fourth Preferred Embodiment

Referring to FIG. 16, a personal communications system in accordance with a fourth preferred embodiment of the present invention includes a wireless communications unit 500, a reader 502, a speaker 504, a microphone 506, an optional display 508 with a memory unit 510, and an antenna 512. The wireless communications unit includes a processor, a memory, a transceiver, and other features necessary for performing wireless communications over a service provider network. The memory of this device stores a program for controlling the processor to perform, for example, all the operations of a conventional wireless phone.

The reader is connected to the wireless communications unit and is adapted to receive a removable recording medium 520, which stores information for activating unit 510 so that wireless communications may be performed. This a, activation information may include a telephone number of a user as well as other information required to activate and/or initialize a phone for facilitating wireless communications. This other information may include serial numbers, location information, and/or data which a wireless provider or even a local exchange carrier may need in order to activate operation of a wireless phone. Activation information of this type is well known. See, for example, U.S. Pat. Nos. 4,486,624 and 5,386,455. The display may perform the normal functions of a cellular phone, including notification of a called telephone number, missed call information, date, time, etc.

The removable recording medium may take virtually any form. For example, as shown in FIG. 17(a), the medium may be located within a card-shaped housing equipped with a window having a slidable cover 525, like in a floppy diskette. In this situation, when inserted into the reader the cover would retract to allow a reader head to read a user's telephone number from the medium inside. Alternatively, as shown in FIG. 17(b), the card-shaped housing may be equipped with input/output data ports 530 of the type, for example, which commonly appear on flash memory cards used to store images taken by a digital camcorders and cameras. The medium may also be in the form of a memory stick which resembles the type used in MP3 players and other electronic devices. As respectively shown in FIGS. 17(c) and (d), this stick may have a rectangular shape, a cylindrical shape, or virtually any other shape. The medium may also be in the shape of a rectangular strip. Of course, the reader of the invention will be adapted to accommodate the shape and type of the removable recording medium.

In accordance with one aspect of the invention, the wireless communications unit is in a fixed location. The unit may be incorporated, for example, within a kitchen appliance such as a refrigerator door, a television, a hard-wired telephone, a seat or other structure of an airplane, or even an interface box in accordance with any of the foregoing embodiments of the invention. Under these circumstances, all activation information but the user's telephone number may be stored beforehand in the memory of the wireless communications unit. The only function performed by the reader would then be to input the telephone number stored on the recording medium into the wireless communication unit. The processor of the unit would then establish communications with a central office or base station of the wireless service provider (e.g., perform initialization and registration operations) to notify the provider that the telephone number is now available for receiving and/or placing calls through the antenna.

The removable recording medium described above is an especially advantageous feature of the invention because it enables users to receive wireless calls without having to carry a phone. Instead, users need only carry the medium itself, which, for example, may be small enough to fit into a shirt pocket, on a key chain, or in a wallet or purse.

Figure 18B:
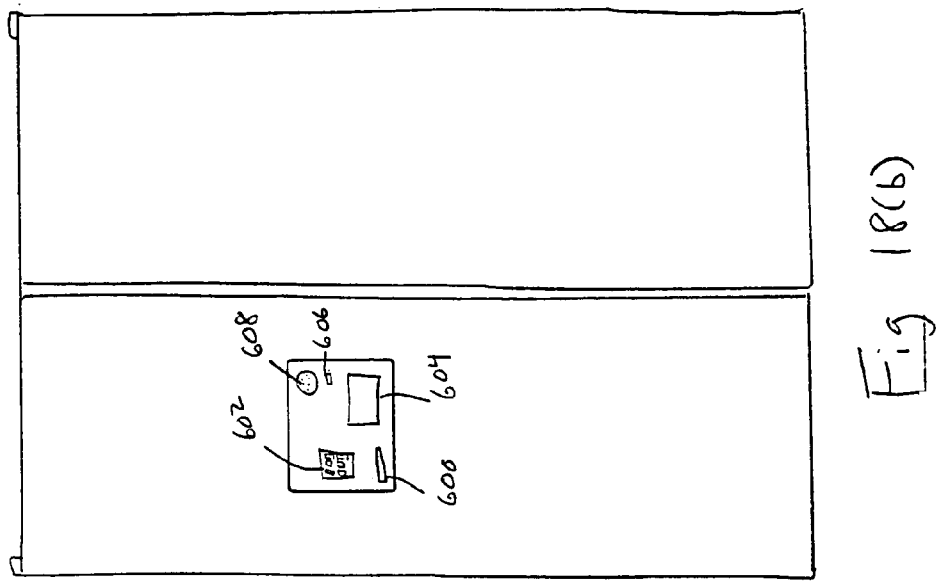
FIG. 18(b) is a diagram of this personal communications system incorporated within an appliance.
Figure 18A:
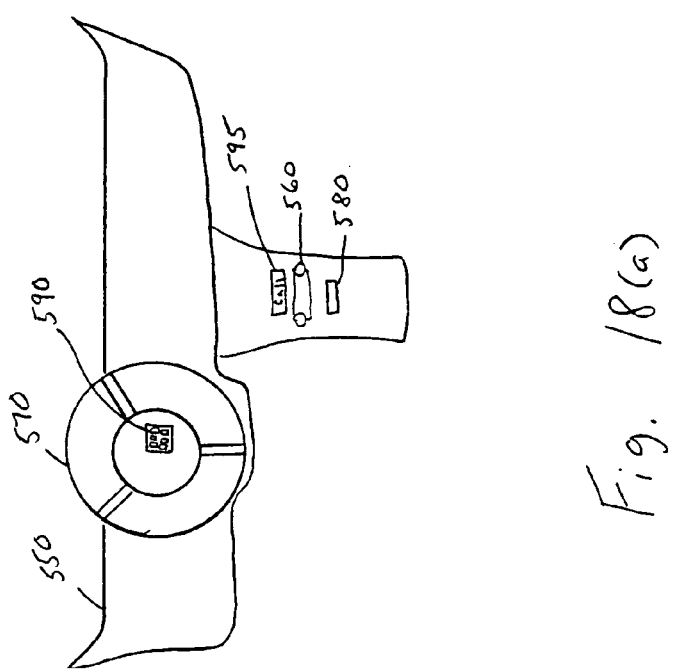
FIG. 18(a) is a diagram of the personal communications system shown in FIG. 16 incorporated within a car.

FIG. 18(a) shows an exemplary application of the invention. In this figure, the communications unit is integrated into the dash 550, radio 560, and/or steering wheel 570 of a car, and the reader includes an input slot 580 situated in a similar location. In operation, users receive and place calls hands-free using speakers and a microphone mounted in the car. Calls may be answered or placed using a keypad 590. Also, if desired, the car radio display 595 may be used to display information typically shown on cell phones, and the car stereo may be used as the speakers. The antenna may be mounted on the rear window or at a non-visible location in the car. Equipped with these features of the invention, the car will advantageously be configured to receive and/or place calls using the telephone phone number of any user provided that user's telephone number is stored on the memory card inserted into the input slot of the reader.

FIG. 18(b) shows another exemplary application wherein the communications unit of the present invention is integrated into the door of a refrigerator. This embodiment is equipped with similar features, including a reader input slot 600, a keypad 602, a display 604, a microphone 606, and a speaker 608. The antenna may be integrated into the door with the communications unit.

Figure 19:
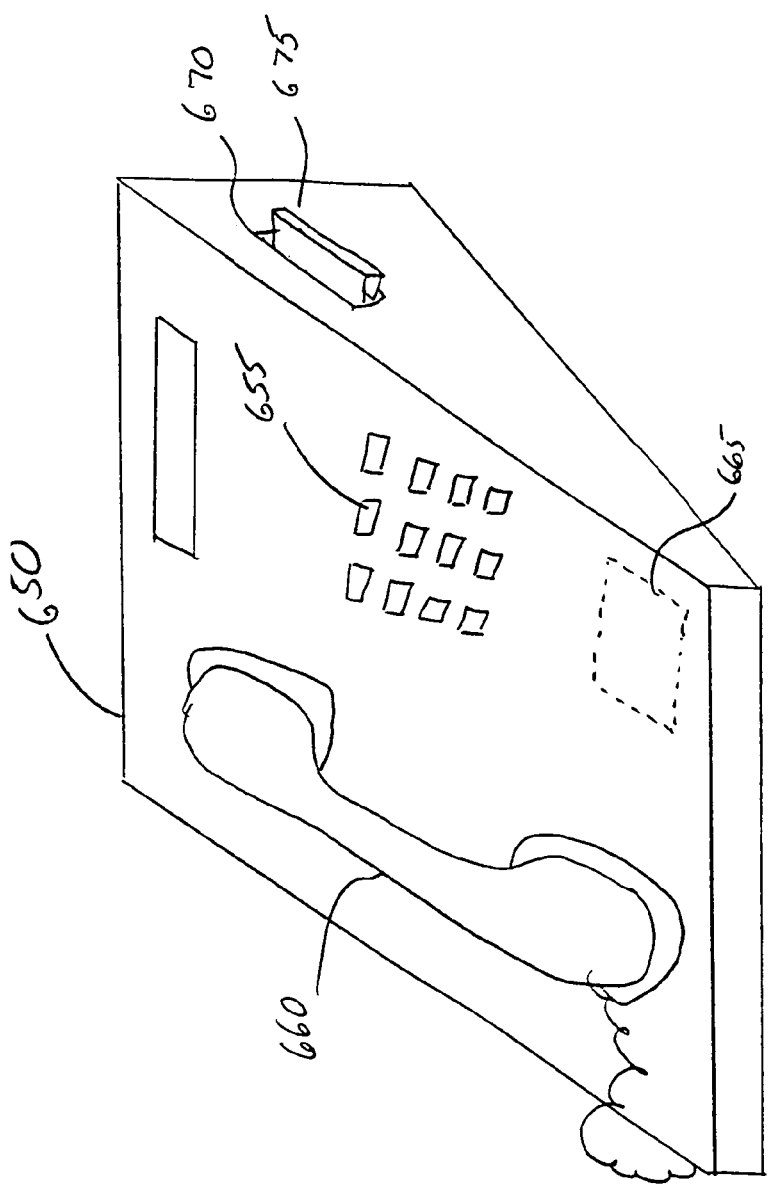
FIG. 19 is a diagram showing a hard-wired telephone equipped with the personal communications system in accordance with the present invention.

FIG. 19 shows another exemplary application wherein the communications unit of the present invention is integrated into a hard-wired telephone 650. Here, the keypad 655 of the hard-wired telephone and the receiver and transmitter of its handset 660 are used to place and receive calls. The communications unit 665 and reader 670 of the present invention are preferably incorporated within the housing of the hard-wired telephone. In operation, a user inserts a removable recording medium (e.g., a memory card) 675 into the reader slot. Activation information (e.g., a telephone number of the user) is then downloaded to the communications unit to configure the unit to receive telephone calls from a wireless service provider once conventional initialization and registration operations are performed.

Figure 20:
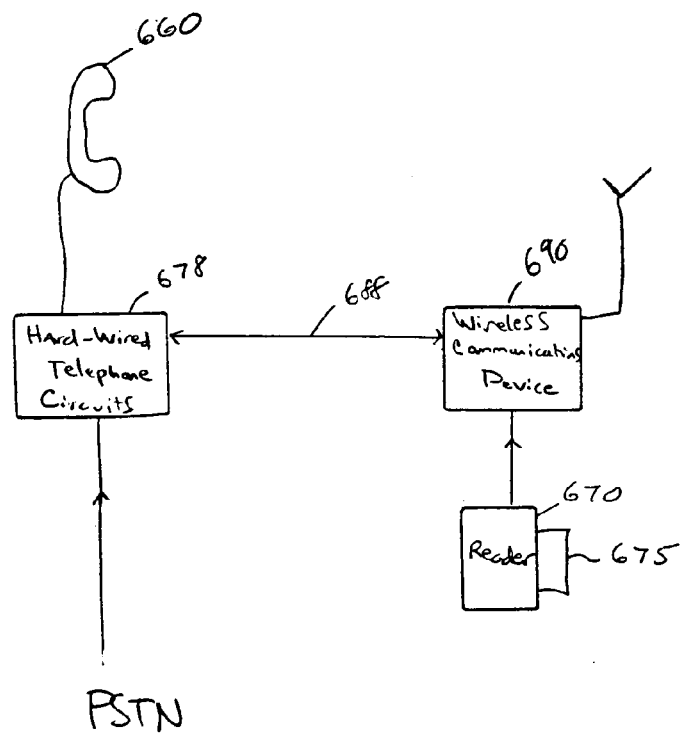
FIG. 20 is a diagram showing a manner in which circuits of the hard-wired telephone shown in FIG. 19 may be configured.

Preferably, the control circuits of the hard-wired telephone are interfaced to the wireless communications unit of the present invention to enable handset 660 to be the receiver and transmitter for the wireless unit. As shown in FIG. 20, the interface between the hard-wired telephone circuits 678 and the wireless communications unit 690 may include signal lines 688 for bidirectionally communicating voice data therebetween. The processor of the communications unit may output a control signal to the hard-wired telephone circuits to prevent the hard-wired telephone from receiving other calls, e.g., from a public-switched telephone network. These calls may, for example, be forwarded to a voice messaging system. The antenna for the wireless communications unit may be located within the hard-wired telephone or the antenna may be a higher-power antenna external to this phone. This latter antenna is preferable, for example, when the invention is used in hotel rooms and the antenna is mounted on the roof.

Figure 21:
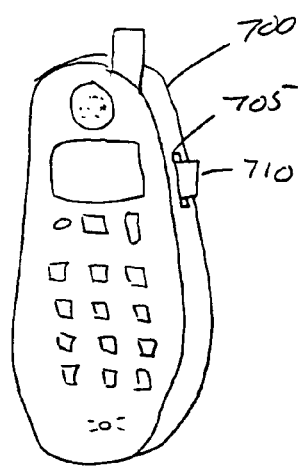
FIG. 21 is a diagram showing a wireless device equipped with the personal communications system in accordance with the present invention.

FIG. 21 shows another embodiment of the present invention. In this embodiment, the communications unit of the present invention is integrated into a wireless device. For illustrative purposes, the wireless device is shown as a cellular phone 700, which includes a reader slot 705 along one surface for receiving a removable recording medium 710 containing activation information. When inserted into the slot, the cell phone is automatically activated to perform wireless communications with a cellular provider in the manner previously described. This embodiment is particularly advantageous because, once the telephone number is read from medium 710, the cell phone is automatically configured to operate using that number. This embodiment is extremely versatile in that use of the cell phone is not limited to any one number, as is the case with conventional cell phones in use today.

The embodiment shown in FIG. 21 may be equipped with several optional features. For example, operation of the cell phone may be predicated on whether or not a removable recording medium is inserted into the reader slot. Under these circumstances, for example, when the medium is removed a processor of the cell phone may switch to a disabled or monitoring state only, i.e., no calls can be received. Conversely, the processor may be programmed to receive calls even when the removable recording medium is inserted into another device equipped with the communications unit of the present invention. Under these circumstances, a call placed to the user's telephone number may ring on both the user's cell phone (if, for example, his wife has the phone for the day) and, for example, a hard-wired telephone such as shown in FIG. 19 located at the user's work and into which a removable medium has been inserted.

Fifth Preferred Embodiment

Figure 22:
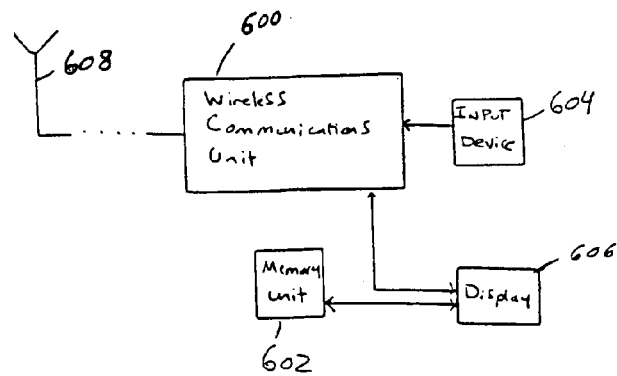
FIG. 22 is a diagram of a personal communications device in accordance with a fifth preferred embodiment of the present invention.

Referring to FIG. 22, a personal communications system in accordance with a fifth preferred embodiment of the present invention operates in a manner similar to the fourth preferred embodiment, except that instead of a reader the fifth embodiment allows a user to enter activation information using a system input device, such as a keypad. More specifically, this system includes a wireless unit 600, a memory unit 602, an input device 604, a display 606, and an antenna 608. The wireless unit is equipped with a processor and other conventional features necessary for performing wireless communications over a service provider network. The memory unit stores a program for controlling the processor to perform wireless communications in this manner and to automatically perform activation in the manner described below.

Unlike conventional cellular phones, where a salesman enters activation information into the phone for the user, the personal communications system of the present invention may automatically be configured, and then re-configured, to allow any user to use the system with his own phone number, without the assistance of a salesman or technician. Preferably, this is accomplished through control software stored in the system memory which, when in program mode, receives activation information from the user which includes a telephone number on a wireless service provider network. The activation information may be entered via the key pad of the system. The phone may automatically be placed in program mode at start up or may be initiated through a mode button on the system keypad.

Figure 23:
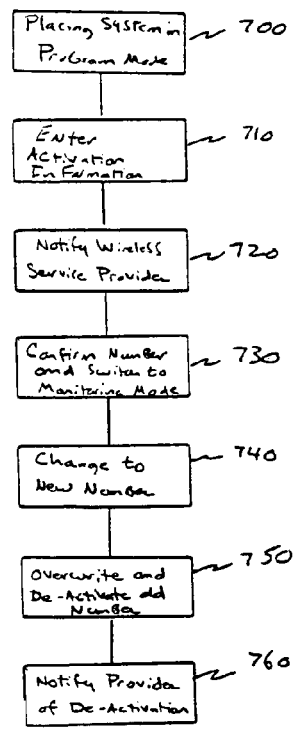
FIG. 23 is a block diagram showing steps included in a method implemented by the personal communications device shown in FIG. 22.

FIG. 23 is a flow diagram showing steps included in this embodiment of the method of the present invention. An initial step, the system is placed in program mode (Block 700) and then activation information including a user's telephone number is entered into the system memory through the keypad (Block 710). In a next step, the system processor automatically transmits a signal to the wireless service provider to provide notification that the telephone number is now available for receiving calls. (Block 720). In response, the provider transmits confirmation information and/or other data of a conventional type back to the system, which is then automatically placed into a call monitoring mode by the processor. (Block 730).

The phone number may be changed to allow a different user to use the system by pressing a mode button on the keypad or at start-up. (Block 740). After the new user enters his telephone number in the manner indicated above, the processor of the wireless communications unit overwrites the old number with the new number or a plurality of new numbers in memory. As a result of this overwriting process, the system is automatically de-activated with respect to the old number. (Block 750). The processor then automatically transmits a message to the wireless service provider indicating that the telephone number is no longer available for receiving calls. (Block 760). The provider then adjusts its system accordingly and any future calls to the old number would, for example, be forwarded to a voice messaging system or the original personal communications device (e.g., a user's cell phone).

Those skilled in the art can appreciate that the wireless service provider may maintain a computer at, for example, a base station or central office which is configured to interact with the control software in the system of the present invention. This interaction may involve the central office computer transmitting all the conventional information required to activate the system so that it is ready to receive calls from or place calls to the provider.

The system of the present invention may include a number of optional features which enhance both its functionality and convenience of use. To provide a level of security, the activation information may include a personal identification number (PIN) or other identification code. The system processor may then compare the code to a set of authorized codes in memory in order to prevent an unauthorized user from gaining access to the system. Alternatively, the PIN number may be transmitted to the wireless service provider where the comparison may be made. In either case, if there is no match the user will be denied use of the system.

In addition to a telephone number and/or a PIN number, the system may be configured to receive time-of-activation information. According to this feature, the user would enter a period of time (e.g., 10 minutes, 2 hours, 1 day, three weeks, etc.) using the keypad which would then be used to program the system processor. In call monitoring mode, the processor would count down the period of time entered and then automatically de-activate the telephone number when that period expires. The internal system clock may be used to perform the comparison.

Preferably, the system includes a graphical user interface which displays an interactive screen when in program mode. This screen may include a prompt instructing the user into enter a new phone number for configuring the system, a prompt for instructing the user to enter a PIN number, and still another prompt to allow a user to enter time-of-activation information as discussed above. Also, remaining time of activation information may be displayed.

The system of the present invention may advantageously be incorporated as a wireless communications unit in a hard-wired telephone. Under these circumstances, the unit may be connected to an antenna located within or remotely from the hard-wired telephone. Further, the processor of the unit may be configured to receive activation information from the keypad of the hard-wired telephone. To guide the user, a display may be included to prompt the user in the manner previously mentioned. Thus, for example, in operation a user may pick up the receiver of the hard-wired telephone and the display may prompt the user to enter a cell phone number. When the numbered is entered using the keypad, the wireless unit communicates with the wireless service provider to provide notification that the calls may be received from or transmitted to that number. As a result, the user will be able to receive phone calls on that telephone, which, for example, may be located in a hotel, hospital, or a guest's house.

Alternatively, the wireless communications unit may be connected to the hard-wired telephone by a network. In this embodiment, a user may push a function button on the hard-wired phone to activate the wireless communications unit which, for example, may be kept at the hotel managers desk. When prompted, the user may then use the keypad of the hard-wired telephone to enter activation information into the memory of the wireless unit, thereby enabling the user to receive calls on his cell phone number using the hard-wired telephone in his hotel room. Another exemplary application of this embodiment include connecting the wireless communications unit to telephones (e.g. GTE AirFone) in an airplane.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. A telephone set, comprising:
    a first wireless communications unit;
    a memory unit for storing activation information; and
    a hard-wired telephone to receive calls from a land line at a first telephone number, the hard-wired telephone including a processor for automatically setting the first wireless communications unit to receive one or more calls from a wireless service provider, said processor automatically setting the first wireless communications unit to receive said calls from a mobile communications network at a phone number of second wireless communications unit which is a user's pre-existing mobile telephone number, wherein the user's pre-existing mobile telephone number is entered through a keypad of the hard-wired telephone for access by the processor for automatically setting the first wireless communications unit.

2. The telephone set of claim 1, wherein, after setting the first wireless communications unit, the processor automatically transmits a signal to the wireless service provider to provide notification that the first wireless communications unit is available to receive calls from the mobile communications network at the user's mobile telephone number of the second wireless communications unit.

3. The telephone set of claim 1, wherein the processor resets the first wireless communications unit to receive calls from the mobile communications network at a mobile telephone number of third wireless communications unit of a new user, after the removable storage medium is replaced with a removable storage medium containing the new user's mobile telephone number.

4. The telephone set of claim 3, wherein the processor transmits a message to the wireless service provider to prevent the first wireless communications unit from receiving calls from any number different from the new user's telephone number.

5. The telephone set of claim 1, wherein the processor automatically prevents the first wireless communications unit from receiving calls corresponding to the mobile telephone number of the user's second wireless communications unit based on time-of-activation information entered by the user.

6. The telephone set of claim 5, wherein the time-of-activation information indicates a period of time, and wherein the processor counts down the period of time while the first wireless communications unit is set in a call monitoring mode to receive calls from the mobile communications network at the mobile telephone number of the user's second wireless communications unit.

7. The telephone set of claim 6, wherein the time-of-activation information is set by the user through operation of the keypad of the hard-wired telephone.

8. The telephone set of claim 1, wherein audio signals corresponding to said calls as received by the first wireless communications unit are output through a handset of the hard-wired telephone.

9. The telephone set of claim 1, wherein the first wireless communications unit, the memory unit, and said processor are included within a housing of the hard-wired telephone.

10. The telephone set of claim 1, wherein the first telephone number is a PSTN number.

11. The telephone set of claim 1, wherein said processor automatically deactivates the first wireless communications unit from receiving calls at the phone number of the second wireless communications unit, and automatically sets the first wireless communications unit to receive calls from the mobile communication network or another mobile communications network at a phone number of a third wireless communications unit corresponding to another user's pre-existing mobile telephone number.

12. A communications system, comprising:
a hard-wired telephone, including a keypad and a transceiver, to receive calls from a land-line at a first telephone number; and
a first wireless communications unit remotely coupled to said hard-wired telephone; and
a memory unit for storing activation information;
wherein the hard-wired telephone includes a processor for automatically setting the first wireless communications unit to receive one or more calls from a wireless service provider, said processor automatically setting the first wireless communications unit to receive said calls from a mobile communications network at a phone number of a second wireless communications unit which is a user's pre-existing mobile telephone number, wherein the user's pre-existing mobile telephone number is entered through a keypad of the hard-wired telephone for access by the processor for automatically setting the first wireless communications unit.

13. The communications system of claim 12, wherein the processor resets the first wireless communications unit to receive calls from the mobile communications network at a mobile telephone number of a third wireless communications unit of a new user, after the removable storage medium is replaced with a removable storage medium containing the new user's mobile telephone number.

14. The communications system of claim 13, wherein the processor transmits a message to the wireless service provider to prevent the first wireless communications unit from receiving calls from any number different from the new user's telephone number.

15. The communications system of claim 12, wherein the processor automatically prevents the first wireless communications unit from receiving calls corresponding to the user's mobile telephone number of the second wireless communications unit based on time-of-activation information entered by the user.

16. The communications system of claim 15, wherein the time-of-activation information indicates a period of time, and wherein the processor counts down the period of time while the first wireless communications unit is set in a call monitoring mode to receive calls based on the user's mobile telephone number.

17. The communications system of claim 15, wherein time-of-activation information is set by the user through operation of the keypad.

18. The communications system of claim 12, wherein audio signals corresponding to said calls as received by the first wireless communications unit are output through a handset of the hard-wired telephone.

19. The communications system of claim 12, wherein the first wireless communications unit, the memory unit, and said processor are included within a housing of the hard-wired telephone.

20. The communications system of claim 12, wherein the first telephone number is a PSTN number.

21. The communications system of claim 12, wherein said processor automatically deactivates the first wireless communications unit from receiving calls at the phone number of the second wireless communications unit, and automatically sets the first wireless communications unit to receive calls from the mobile communications network or another mobile communications network at a phone number of a third wireless communications unit corresponding to another user's pre-existing mobile telephone number.

22. A telephone set, comprising:
a first wireless communications unit;
a reader that reads information from a removable storage medium; and
a hard-wired telephone to receive calls from a land line at a first telephone number, the hard-wired telephone including a processor for automatically setting the first wireless communications unit to receive one or more calls from a wireless service provider, said processor automatically setting the first wireless communications unit to receive said calls from a mobile communications network at a phone number of a second wireless communications unit which is a user's pre-existing mobile telephone number read by the reader from the removable storage medium.

23. The telephone set of claim 22, wherein the reader reads a user identification code from the removable storage medium, and wherein said processor compares the user identification code to a pre-stored code to authorize receiving calls from the mobile communications network at the mobile telephone number of the user.

24. The telephone set of claim 22, wherein the information stored on the removable storage medium includes a serial number used to authorize receipt of said calls.

25. The telephone set of claim 22, wherein the information stored on the removable storage medium includes location information used to authorize receipt of said calls.

26. The telephone set of claim 22, wherein the information stored on the removable storage medium includes information which the wireless service provider or a local exchange carrier needs to activate operation of a wireless phone.

27. The telephone set of claim 22, further comprising: a communications port to receive telephone calls through a public switched telephone network.

28. The telephone set of claim 27, wherein the telephone calls received through the public switched telephone network bypass the first wireless communications unit.

29. The telephone set of claim 27, wherein the processor generates a control signal to prevent reception of calls through the public switched telephone network when the first wireless communications unit is activated.

30. The telephone set of claim 27, wherein the first wireless communications unit is deactivated to allow calls to be received through the public switched telephone network when no removable storage medium is coupled to the reader.

31. The telephone set of claim 22, further comprising: a connector to connect the first wireless communications unit to a remotely located antenna.

32. The telephone set of claim 31, wherein the hard-wired telephone is located in a hotel room.

33. The telephone set of claim 22, wherein the hard-wired telephone includes a keypad to enter a phone number to be dialed by the user based on the user's mobile telephone number of the second wireless communications unit to which the first wireless communications unit is set by said processor.

34. The telephone set of claim 22, further comprising: a USB port coupled to the removable storage medium for transferring said information to the reader.

35. The telephone set of claim 22, wherein the hard-wired telephone is located in a kitchen appliance.

36. The telephone set of claim 35, wherein the processor places the first wireless communications unit in call monitoring mode after receiving a confirmation signal from the wireless service provider, the confirmation signal received in response to the notification signal.

37. The telephone set of claim 22, wherein audio signals corresponding to said calls as received by the first wireless communications unit are output through a handset of the hard-wired telephone.

38. The telephone set of claim 22, wherein the first wireless communications unit, the memory unit, and said processor are included within a housing of the hard-wired telephone.

39. The telephone set of claim 22, wherein the first telephone number is a PSTN number.

40. The telephone set of claim 22, wherein said processor automatically deactivates the first wireless communications unit from receiving calls at the phone number of the second wireless communications unit, and automatically sets the first wireless communications unit to receive calls from the mobile communications network or another mobile communications network at a phone number of a third wireless communications unit corresponding to another user's pre-existing mobile telephone number.

41. The telephone set of claim 22, wherein the reader is included in the hard-wired telephone.

* * * * *